United States Patent [19]

El-Antably

[11] Patent Number: 4,459,502
[45] Date of Patent: Jul. 10, 1984

[54] SELF-CASCADED RELUCTANCE MOTOR WITH AXIALLY LAMINATED ROTOR

[75] Inventor: Ahmed M. El-Antably, Monroeville, Pa.

[73] Assignee: Westinghouse Electric Corp., Pittsburgh, Pa.

[21] Appl. No.: 442,480

[22] Filed: Nov. 17, 1982

[51] Int. Cl.³ .............................................. H02K 3/06
[52] U.S. Cl. ................................... 310/184; 310/125; 310/217; 318/737
[58] Field of Search .......................... 318/737, 49, 50; 310/42, 162, 163, 179, 185, 192, 194, 211, 216, 217, 261, 125, 184, 112

[56] References Cited

U.S. PATENT DOCUMENTS

| 3,045,135 | 7/1962 | Honsinger | 310/162 |
| 3,636,553 | 8/1972 | Broadway et al. | 318/737 |
| 4,074,160 | 2/1978 | Broadway | 310/184 |
| 4,110,646 | 8/1978 | Rao | 310/163 |

FOREIGN PATENT DOCUMENTS 24838 of 1915 United Kingdom ................ 318/737

OTHER PUBLICATIONS

"Axially Laminated Anisotropic Rotors For Reluctance Motors", Proc. IEE, vol. 113, No. 12, Dec. 1966, by Cruickshank et al.

Primary Examiner—J. D. Miller
Assistant Examiner—D. L. Rebsch
Attorney, Agent, or Firm—R. P. Lenart

[57] ABSTRACT

A self-cascaded reluctance motor is provided with an axially laminated rotor. The motor includes a stator winding having two sets of terminals and wound such that the number of poles between one set of terminals differs from the number of poles between the other set of terminals by more than two. The rotor includes a plurality of axially disposed conductive sheets and magnetic material laminations which are interleaved within each rotor segment to form groups of magnetic material laminations which lie between two of the conductive sheets. The number of conductive laminations is equal to one half of the total number of stator winding poles or an integral submultiple thereof, while the number of groups of magnetic material laminations is equal to one half of the total number of stator pole pairs or an integral submultiple thereof. Short-circuited coils can be substituted for the conductive sheets to provide better coupling between the two stator component windings and thus more output power.

28 Claims, 6 Drawing Figures

SELF-CASCADED RELUCTANCE MOTOR WITH AXIALLY LAMINATED ROTOR

BACKGROUND OF THE INVENTION

This invention relates to rotary electric machines and more particularly to self-cascaded alternating current reluctance motors having axially laminated rotors.

Self-cascaded rotary machines include a stator winding which is wound to produce two fields of different pole numbers. Such machines have been designed which utilize squirrel cage rotors, wound rotors or reluctance type rotors. U.S. Pat. No. 3,686,553 issued Aug. 22, 1972 to Broadway et al, discloses a self-cascaded three-phase alternating current machine having a stator winding and a rotor wherein the stator winding has component coils connected between two sets of terminals and is wound to provide a winding of a first pole number between one set of terminals and a second pole number between the second set of terminals with the rotor being constructed such that when it is rotated relative to a magnetic field of the first pole number, it creates a magnetic field of the second pole number which rotates in the opposite direction of the first field relative to the rotor. The rotor may be of the wound type, the reluctance type, or a combination of both the reluctance type and wound forms. Self-cascaded electrical motors can be made to run synchronously by the simultaneous application of alternating current and direct current to the stator windings.

Reluctance motor rotors have been constructed by assembling a plurality of radial laminations which are stacked axially. Openings were provided in the radial laminations to control the ratio of the direct axis reactance $x_d$ to the quadrature axis reactance $x_q$. Since improved synchronous performance can be achieved by increasing the $x_d/x_q$ ratio, axially laminated rotors were developed to provide a larger $x_d/x_q$ ratio. Reluctance motors using axially laminated rotors having been disclosed by Cruickshank et al. in "Axially Laminated Anisotropic Rotors for Reluctance Motors", Proc. IEE, Vol. 113, No. 12, pp. 2058–2060, December 1966, and "Theory and Performance of Reluctance Motors with Axially Laminated Anisotropic Rotors," Proc. IEE, Vol. 118, No. 7, pp. 887–894, July 1971. These articles disclose four pole rotors of cut C core construction. The rotors are assembled by winding strips of cold-rolled, grain-oriented steel on circular forms using standard C core winding methods. Four C cores are cut from this winding, inverted and bolts to a steel shaft using non-magnetic bolts. The rotor is then machined to the appropriate diameter. Rotors having a pole-pitch to pole-arc ratio (B) of 0.94 have been constructed in this manner. However, it has been found necessary to limit the value of B to approximately 0.45 to allow sufficient room for cage bars, which improve the motor starting characteristics. Rotors constructed using standard C core methods as described have limited B values, a limited number of poles, relatively complex construction, high rotor inertia, and the number of rotor poles is practically limited to four.

U.S. Pat. No. 4,110,646 issued Aug. 29, 1978 to Rao discloses a synchronous reluctance motor with an axially laminated rotor having an even number of segments extending from one pole center to another with each segment composed of a plurality of interleaved magnetic and conductive sub-segments to provide increased direct axis reluctance and decreased quadrature axis reluctance. The present invention discloses a doubly-excited reluctance motor having an axially laminated rotor which can have either an even or odd number of poles, wherein the number of rotor poles is equal to the number of pole pairs between two sets of stator winding terminals, or an integral submultiple of that number, with the stator being wound such that the number of poles between one pair of terminals differs from the number of poles between the other pair of terminals by more than two.

By using an axially laminated rotor having a large direct axis to quadrature axis reluctance ratio and applying a direct current through part of the stator winding, a self-cascaded synchronous reluctance motor having a leading power factor can be constructed in accordance with the present invention. Variable speed operation can be achieved by driving the motor with a variable frequency inverter power source. Since the motor has a leading power factor, a naturally commutated inverter can be used which is less expensive to design and build than a forced commutated inverter. In addition, since the mechanical output power in a cumulative cascade connection is provided by the two stator component windings in a ratio approximately equal to that of their pole numbers, it is possible to choose a proper pole combination such that less power is provided through the a.c. component winding. This will reduce the size, cost and weight of the naturally commutated inverter.

SUMMARY OF THE INVENTION

A self-cascaded reluctance motor constructed in accordance with the present invention comprises a stator winding having two sets of terminals and wound such that the number of poles between one set of terminals differs from the number of poles between the other set of terminals by more than two, and further includes a rotor which comprises:

a shaft having a plurality of generally wedge-shaped openings symmetrically disposed around its periphery;

a plurality of generally wedge-shaped magnetic material laminations axially disposed within each of the openings;

a plurality of generally wedge-shaped conductive sheets axially disposed within each of the openings and interleaved with the magnetic material laminations to form a preselected number of groups of magnetic material laminations, which is equal to one-half of the stator pole pairs or an integral submultiple thereof, wherein each group lies between two of the conductive sheets and the number of conductive sheets is equal to the total number of pole pairs formed by the stator winding, or an integral submultiple of that number; and means for securing the magnetic material laminations and conductive sheets within each of the openings.

This self-cascaded reluctance motor can be used in an operating system in accordance with this invention wherein an alternating current power source is connected to one set of stator winding terminals and a direct current power source is connected to the other set of stator winding terminals. The motor is powered solely by the a.c. source during initial acceleration. Once it gets near synchronous speed, direct current is applied and it synchronizes directly.

With sufficient direct current excitation the reluctance motor has a leading power factor, and a naturally commutated inverter can be used as the alternating current power source. During initial acceleration a forced commutation means must be employed. Rotor inertia may be lowered by substituting a hollow spider structure for the rotor shaft. Where increased starting torque is required short circuited rotor windings can be used in place of the conductive sheets. In that case, the number of short circuited rotor windings is equal to the total number of pole pairs formed by the stator winding, or is an integral submultiple of it.

DESCRIPTION OF THE PREFERRED EMBODIMENT

Figure 1:
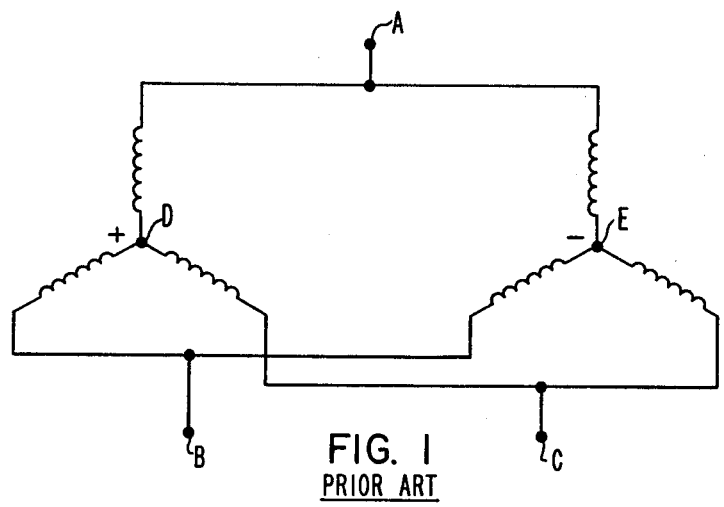
FIG. 1 is a schematic diagram of a prior art self-cascaded rotary electric machine stator winding.

The stator winding of the preferred embodiment of the present invention is a two-component polyphase winding connected in accordance with the prior art schematic diagram of FIG. 1. A pair of three-phase star connected windings are connected in parallel to a first set of terminals A, B and C with their star points being connected to a second set of terminals D and E. The stator winding is wound to form one pole number 2P with respect to terminals A, B and C, and a second pole number 2Q with respect to terminals D and E. In general, there may be any number of parallel paths, in place of the two per phase as shown in this embodiment. In addition, the stator winding may be designed to have other numbers of phases, for example two, three, four or six, with two or more star points. In this invention, a D.C. voltage would then be applied to any two star points while connecting the remaining star points to either side of the D.C. source. This could be advantageous in certain applications.

Figure 2:
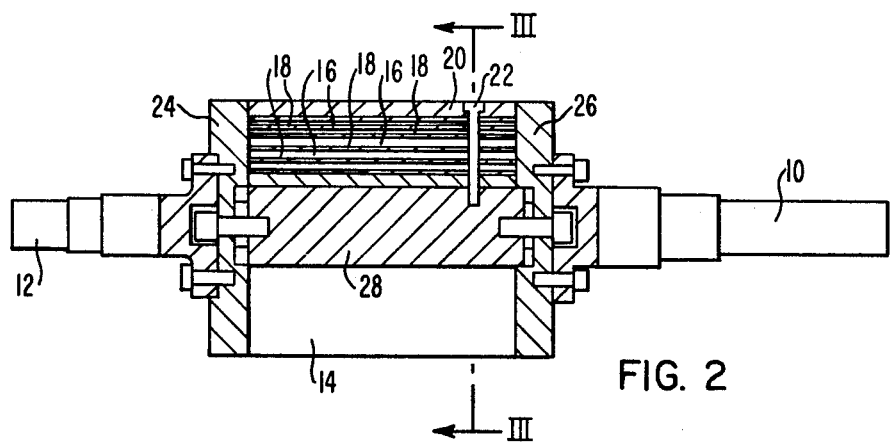
FIG. 2 is a cross-section of an axially laminated reluctance rotor for use in a motor constructed in accordance with one embodiment of the present invention.

The rotor of FIG. 2 includes two stub shafts 10 and 12 connected to a non-conductive, non-magnetic spider assembly having a plurality of wedge-shaped openings symmetrically disposed around its periphery. The number of openings, P+Q, is equal to one half of the total number of poles formed by the winding of FIG. 1 between the two sets of terminals A, B and C, and D and E. A plurality of generally wedge-shaped magnetic material laminations 16 are axially disposed within each of the shaft openings. A plurality of generally wedge-shaped conductive sheets 18 are also axially disposed within each of the openings and are interleaved with the magnetic material laminations 16 to form a preselected number of groups of magnetic material laminations, which is equal to one-half of the number of stator pole pairs or an integral submultiple thereof, wherein each group lies between two of the conductive sheets 18. The number of conductive sheets 18 is equal to one half of the total number of poles, P+Q, formed by the winding of FIG. 1 between the two sets of terminals A, B, and C, and D and E. Each rotor segment further includes a wedge 20 disposed adjacent to the outermost one of the conductive sheets 18 and a non-magnetic bolt 22 which passes through the wedge 20 and laminations 16 and sheets 18, and serves as means for securing the laminations and sheets within the rotor shaft openings. A pair of conductive end plates 24 and 26 are disposed adjacent to each end of conductive sheets 18 and are electrically insulated from conductive sheets 18. In addition, conductive sheets 18 are insulated from each other. In order to minimize rotor inertia, the central portions 28 of spider assembly 14 may be removed.

Figure 3:
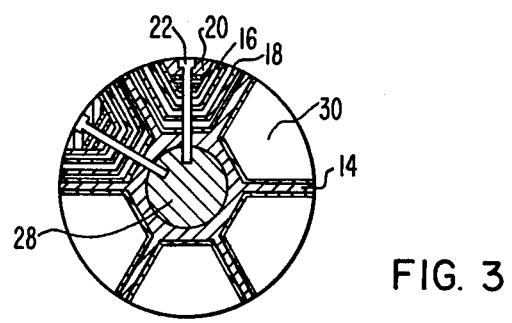
FIG. 3 is a cross-section of the rotor of FIG. 2 taken along line III—III.

FIG. 3 is a cross section of the rotor of FIG. 2 taken along line III—III. This view of the rotor illustrates the symmetrical distribution of openings 30 around the periphery of rotor spider assembly 14 and shows the wedge shape of laminations 16 and sheets 18.

Figure 4:
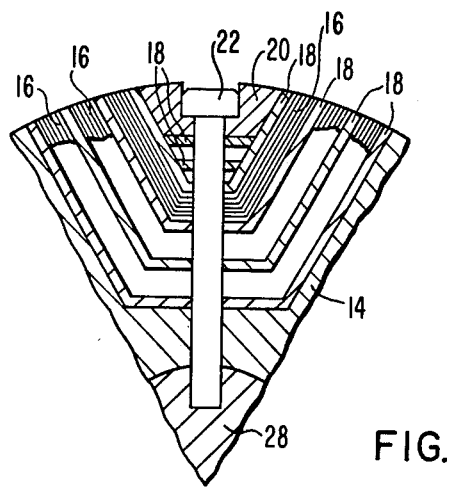
FIG. 4 is a cross-section of one segment of the rotor of FIG. 2.

FIG. 4 is an enlarged cross-section of one of the segments of the rotor of FIG. 2. In this view, the plurality of magnetic material laminations 16 can be seen to be interleaved with conductive sheets 18 to form three groups of magnetic material laminations wherein each group is disposed between two of the conductive sheets 18. The number of conductive laminations 18 is chosen to be equal to one half of the total number of stator winding poles in this embodiment, although it may be an integral submultiple of that number. A metallic conductor such as aluminum sheets can be used to form the conductive sheets. Grain oriented steel can be used to form the magnetic material laminations 16. The existence of the conductive sheets increases the coupling between the two stator component windings and greatly improves the performance of the rotor. To allow for excitation at high frequencies, the laminations and sheets of the preferred embodiment have a thickness of approximately 0.011 inches.

Figure 5:
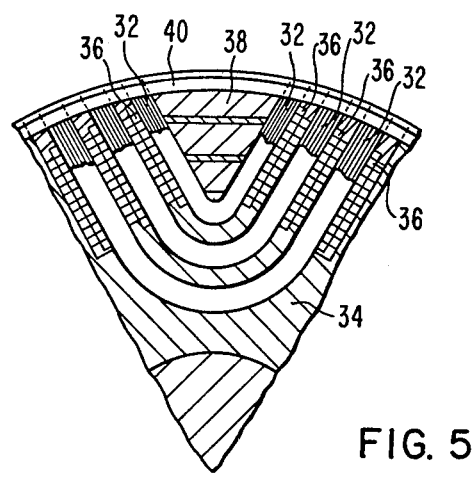
FIG. 5 is a cross-section of an alternative embodiment of one segment of the rotor.

FIG. 5 is a cross-section of an alternative embodiment of one of the rotor segments. In this embodiment, a plurality of generally U-shaped magnetic material laminations 32 are radially stacked into three groups and extend axially in an opening in spider shaft 34. A plurality of conductors 36 are positioned between the groups of magnetic material laminations and connected at each end of the rotor to form a plurality of short circuited rotor coils which are interleaved between groups of magnetic material laminations within openings around the periphery of spider shaft 34. A plurality of generally wedge shaped inserts 38 are disposed adjacent to the outer group of magnetic material laminations 32. The inserts, laminations and coils are held in the openings of spider shaft 34 by retaining rings 40 which are located at various positions around the periphery of the rotor. In this embodiment, retaining ring 40 passes through notches in inserts 38, laminations 32 and spider shaft 34 so that the laminations extend to the surface of the rotor except where they are notched to receive the retaining ring.

Figure 6:
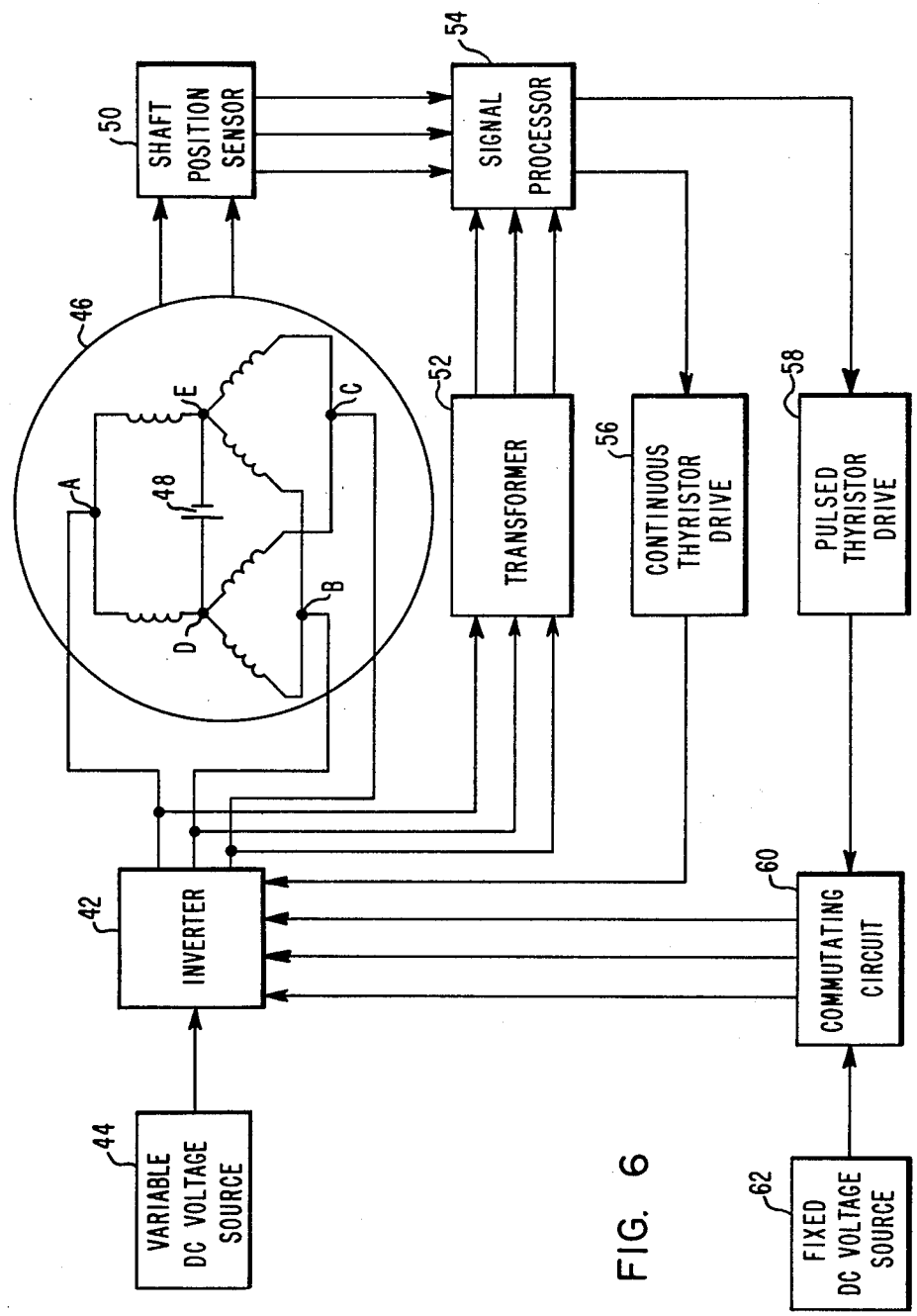
FIG. 6 is a block diagram of a motor system in accordance with one embodiment of this invention.

The self-cascaded reluctance motor of this invention can be used in an operating system as shown in FIG. 6 wherein a three-phase alternating current power such as inverter 42, receives power from a variable DC voltage source 44 and supplies current to terminals A, B and C of motor 46, connected as in FIG. 1, while a direct current power source 48 supplies current to terminals D and E of motor. To allow for the creation of a reverse voltage across the thyristors of inverter 42 for commutating purposes, the firing of thyristors within naturally commutated inverter 42 must be initiated at an advance angle with respect to phase currents being supplied to terminals A, B and C. Shaft position sensor 50 produces a signal which is proportional to the shaft angle. A second signal proportional to motor phase current is produced by transformer 52. These signals are received by signal processor 54 which controls thyristor drive circuits 56 and 58. To start motor 46, d.c. power source 48 is initially disconnected and the motor starts as an induction motor which is driven by the a.c. output of inverter 42. The d.c. source is then connected between terminals D and E, thereby causing motor 46 to lock into synchronous speed $W_s/(P+Q)$; where $W_s$ is the angular frequency of the inverter output and P and Q are the number of pole pairs of the stator component windings. During the starting period, the motor 46 is operating at a logging power factor. Therefore, commutating circuit 60, which is connected to fixed d.c. voltage source 62, is needed to turn off the thyristors of inverter 42. Following the application of d.c. voltage to terminals D and E, the motor operates at a leading power factor, and commutating circuit 60 can be disconnected.

The disclosed axially laminated rotor can be constructed more easily than squirrel cage or wound rotors. Expensive dies which are needed to punch radial laminations are not required for axial laminations. Since all laminations are bent at the same angle, they can be formed in a single press operation. Therefore, the disclosed rotor lends itself to automatic mass production procedures.

While there has been disclosed what at present is believed to be the preferred embodiment of the invention, it will be understood by those skilled in the art that various changes or modifications may be made without departing from the invention. It is therefore intended that the appended claims cover all such changes and modifications which fall within the scope of this invention.

What is claimed is:

1. A reluctance motor comprising:
   a stator winding having two sets of terminals and wound to form a first number of poles between a first set of said terminals and a second number of poles between the other set of terminals, such that the number of poles between said first set of said terminals differs from the number of poles between the other set of said terminals by more than two;
   a non-conductive, non-magnetic rotor spider assembly having a plurality of wedge-shaped openings extending axially along and angularly around its periphery;
   a plurality of generally wedge-shaped magnetic material laminations axially disposed within said rotor spider openings;
   a plurality of generally wedge-shaped conductive sheets axially disposed within each of said openings and interleaved with said magnetic material laminations to form a preselected number of groups of magnetic material laminations wherein each group lies between two of said conductive sheets and the number of conductive sheets is equal to one half of the total number of stator winding poles; and
   means for securing said magnetic material laminations and said conductive sheets within each of said openings.

2. A reluctance motor as recited in claim 1, further comprising:
   a first end plate disposed adjacent to one end of said conductive sheets; and
   a second end plate disposed adjacent to a second end of said conductive sheets.

3. A reluctance motor as recited in claim 1, wherein said preselected number of groups of magnetic material laminations is equal to one half of the number of stator winding pole pairs.

4. A reluctance motor as recited in claim 1, wherein said conductive sheets are aluminum sheets.

5. A reluctance motor as recited in claim 1, wherein said magnetic material laminations are grain-oriented steel sheets.

6. A reluctance motor as recited in claim 1, wherein said means for securing said magnetic material laminations and said conductive sheets comprises:
   a wedge disposed adjacent to the outermost one of said conductive sheets; and
   a non-magnetic bolt passing through said wedge and through said conductive and magnetic material laminations.

7. A reluctance motor comprising:
   a stator winding having two sets of terminals and wound to form a first number of poles between a first set of said terminals and a second number of poles between the other set of terminals, such that the number of poles between said first set of said terminals differs from the number of poles between the other set of said terminals by more than two;
   a non-conductive, non-magnetic rotor spider assembly having a plurality of wedge-shaped openings extending axially along and angularly around its periphery;
   a plurality of generally wedge-shaped magnetic laminations axially disposed within said rotor spider openings;
   a plurality of conductors forming short-circuited coils disposed within each of said openings and interleaved with said magnetic material laminations to form a preselected number of groups of magnetic material laminations wherein the number of said coils is equal to one half of the total number of poles of said stator winding; and
   means for securing said magnetic material laminations and said coils within each of said openings.

8. A reluctance motor as recited in claim 7, wherein said preselected number of groups of magnetic material laminations is equal to one half of the number of stator pole pairs.

9. A reluctance motor as recited in claim 7, wherein said magnetic material laminations are grain-oriented steel sheets.

10. A reluctance motor as recited in claim 7, wherein said means for securing said magnetic material laminations and said coils comprises:
    a wedge disposed adjacent to the outermost one of said magnetic material laminations; and
    a retaining ring disposed around the periphery of said rotor shaft.

11. A reluctance motor operating system comprising:
    a reluctance motor having a stator winding;
    said stator winding having two sets of terminals and being wound to form a first number of poles between a first set of said terminals and a second number of poles between the other set of terminals, such that the number of poles between said first set of said terminals differs from the number of poles between the other set of said terminals by more than two;
    a naturally commutated alternating current inverter power source;

means for connecting said alternating current power source to a first one of said sets of terminals;
a direct current power source;
means for connecting said direct current power source to a second one of said sets of terminals;
a non-conductive, non-magnetic rotor spider assembly having a plurality of wedge-shaped openings extending axially along and angularly around its periphery;
a plurality of generally wedge-shaped magnetic laminations axially disposed within said rotor spider openings;
a plurality of generally wedge-shaped conductive sheets axially disposed within each of said openings and interleaved with said magnetic material laminations to form a preselected number of groups of magnetic material laminations wherein each group lies between two of said conductive sheets and the number of said conductive sheets is equal to one half of the total number of stator winding poles; and
means for securing said magnetic material laminations and said conductive sheets within each of said openings.

12. A reluctance motor operating system as recited in claim 11, further comprising:
means for disconnecting said direct current power source during starting of the motor; and
means for commutating said alternating current inverter power source during starting of the motor.

13. A reluctance motor operating system comprising:
a reluctance motor having a stator winding;
said stator winding having two sets of terminals and being wound to form a first number of poles between a first set of said terminals and a second number of poles between the other set of terminals, such that the number of poles between said first set of said terminals differs from the number of poles between the other set of said terminals by more than two;
a naturally commutated alternating current inverter power source;
means for connecting said alternating current power source to a first one of said sets of terminals;
a direct current power source;
means for connecting said direct current power source to a second one of said sets of terminals;
a non-conductive, non-magnetic rotor spider assembly having a plurality of wedge-shaped openings extending axially along and angularly around its periphery;
a plurality of generally wedge-shaped magnetic laminations axially disposed within said rotor spider openings;
a plurality of conductors forming shortcircuited coils disposed within each of said openings and interleaved with said magnetic material laminations to form a preselected number of groups of magnetic material laminations wherein the number of said coils is equal to one half of the total number of poles of said stator winding; and
means for securing said magnetic material laminations and said coils within each of said openings.

14. A reluctance motor operating system as recited in claim 13, further comprising:
means for disconnecting said direct current power source during starting of the motor; and
means for commutating said alternating current inverter power source during starting of the motor.

15. A reluctance motor comprising:
a stator winding having two sets of terminals and wound to form a first number of poles between a first set of said terminals and a second number of poles between the other set of terminals, such that the number of poles between said first set of said terminals differs from the number of poles between the other set of said terminals by more than two;
a non-conductive, non-magnetic rotor spider assembly having a plurality of wedge-shaped openings extending axially along and angularly around its periphery;
a plurality of generally wedge-shaped magnetic material laminations axially disposed within said rotor spider openings;
a plurality of generally wedge-shaped conductive sheets axially disposed within each of said openings and interleaved with said magnetic material laminations to form a preselected number of groups of magnetic material laminations wherein each group lies between two of said conductive sheets and the number of conductive sheets is equal to an integral submultiple of one half of the total number of stator winding poles; and
means for securing said magnetic material laminations and said conductive sheets within each of said openings.

16. A reluctance motor as recited in claim 15, further comprising:
a first end plate disposed adjacent to one end of said conductive sheets; and
a second end plate disposed adjacent to a second end of said conductive sheets.

17. A reluctance motor as recited in claim 15, wherein said preselected number of groups of magnetic material laminations is equal to an integral submultiple of one half of the number of stator winding pole pairs.

18. A reluctance motor as recited in claim 15, wherein said conductive sheets are aluminum sheets.

19. A reluctance motor as recited in claim 15, wherein said magnetic material laminations are grain-oriented steel sheets.

20. A reluctance motor as recited in claim 15, wherein said means for securing said magnetic material laminations and said conductive sheets comprises:
a wedge disposed adjacent to the outermost one of said conductive sheets; and
a non-magnetic bolt passing through said wedge and through said conductive and magnetic material laminations.

21. A reluctance motor operating system comprising:
a reluctance motor having a stator winding;
said stator winding having two sets of terminals and being wound to form a first number of poles between a first set of said terminals and a second number of poles between the other set of terminals, such that the number of poles between said first set of said terminals differs from the number of poles between the other set of said terminals by more than two;
a naturally commutated alternating current inverter power source;
means for connecting said alternating current power source to a first one of said sets of terminals;
a direct current power source;

means for connecting said direct current power source to a second one of said set of terminals;

a non-conductive, non-magnetic rotor spider assembly having a plurality of wedge-shaped openings extending axially along and angularly around its periphery;

a plurality of generally wedge-shaped magnetic laminations axially disposed within said rotor spider openings;

a plurality of conductors forming shortcircuited coils disposed within each of said openings and interleaved with said magnetic material laminations to form a preselected number of groups of magnetic material laminations wherein the number of said coils is equal to an integral submultiple of one half of the total number of poles of said stator winding; and means for securing said magnetic material laminations and said coils within each of said openings.

22. A reluctance motor operating system as recited in claim 21, further comprising:

means for disconnecting said direct current power source during starting of the motor; and means for commutating said alternating current inverter power source during starting of the motor.

23. A reluctance motor comprising:

a stator winding having two sets of terminals and wound to form a first number of poles between a first set of said terminals and a second number of poles between the other set of terminals, such that the number of poles between said first set of said terminals differs from the number of poles between the other set of said terminals by more than two;

a non-conductive, non-magnetic rotor spider assembly having a plurality of wedge-shaped openings extending axially along and angularly around its periphery;

a plurality of generally wedge-shaped magnetic laminations axially disposed within said rotor spider openings;

a plurality of conductors forming shortcircuited coils disposed within each of said openings and interleaved with said magnetic material laminations to form a preselected number of groups of magnetic material laminations wherein the number of said coils is equal to an integral submultiple of one half of the total number of poles of said stator winding; and means for securing said magnetic material laminations and said coils within each of said openings.

24. A reluctance motor as recited in claim 23, wherein said preselected number of groups of magnetic material laminations is equal to an integral submultiple of one half of the number of stator pole pairs.

25. A reluctance motor as recited in claim 23, wherein said magnetic material laminations are grain-oriented steel sheets.

26. A reluctance motor as recited in claim 23, wherein said means for securing said magnetic material laminations and said coils comprises:

a wedge disposed adjacent to the outermost one of said magnetic material laminations; and a retaining ring disposed around the periphery of said rotor shaft.

27. A reluctance motor operating system comprising:

a reluctance motor having a stator winding;

said stator winding having two sets of terminals and being wound to form a first number of poles between a first set of said terminals and a second number of poles between the other set of terminals, such that the number of poles between said first set of said terminals differs from the number of poles between the other set of said terminals by more than two;

a naturally commutated alternating current inverter power source;

means for connecting said alternating current power source to a first one of said sets of terminals;

a direct current power source;

means for connecting said direct current power source to a second one of said sets of terminals;

a non-conductive, non-magnetic rotor spider assembly having a plurality of wedge-shaped openings extending axially along and angularly around its periphery;

a plurality of generally wedge-shaped magnetic laminations axially disposed within said rotor spider openings;

a plurality of generally wedge-shaped conductive sheets axially disposed within each of said openings and interleaved with said magnetic material laminations to form a preselected number of groups of magnetic material laminations wherein each group lies between two of said conductive sheets and the number of said conductive sheets is equal to an integral submultiple of one half of the total number of stator winding poles; and means for securing said magnetic material laminations and said conductive sheets within each of said openings.

28. A reluctance motor operating system as recited in claim 27, further comprising:

means for disconnecting said direct current power source during starting of the motor; and means for commutating said alternating current inverter power source during starting of the motor.

* * * * *